(12) United States Patent
Pluta et al.

(10) Patent No.: US 6,354,344 B1
(45) Date of Patent: Mar. 12, 2002

(54) AUTOMATIC SHUTOFF DEVICE FOR FILTERED BOTTLED WATER DISPENSER

(75) Inventors: Michael Pluta, German Valley, IL (US); Steven A. Griffin, Baton Rouge, LA (US); Howard Meinert, Cederburg, WI (US); Michael S. Marszalec; Edward Donselman, both of Freeport, IL (US)

(73) Assignee: Elkay Manufacturing Co., Oak Brook, IL (US)

( * ) Notice: Subject to any disclaimer, the term of this patent is extended or adjusted under 35 U.S.C. 154(b) by 0 days.

(21) Appl. No.: 09/618,711

(22) Filed: Jul. 18, 2000

(51) Int. Cl.$^7$ .................................................. B65B 1/04
(52) U.S. Cl. ................... 141/192; 141/286; 222/189.06; 210/282; 210/464; 210/469
(58) Field of Search ........................ 222/189.06, 189.09, 222/185.1, 146.6; 141/192, 85, 286, 364; 210/282, 464, 469, 472

(56) References Cited

U.S. PATENT DOCUMENTS

| | | |
|---|---|---|
| 2,860,511 A | 11/1958 | Wickesser |
| 3,237,771 A | 3/1966 | Greenawalt et al. |
| 4,444,336 A | 4/1984 | Nielsen |
| 4,481,562 A | 11/1984 | Hickson |
| 4,487,333 A | 12/1984 | Pounder et al. |
| 4,528,093 A | 7/1985 | Winer |
| 4,589,435 A | 5/1986 | Aldrich |
| 4,698,164 A | 10/1987 | Ellis |
| 4,764,274 A | 8/1988 | Miller |
| 4,807,661 A | 2/1989 | Lewis et al. |
| 4,898,667 A | 2/1990 | Diman et al. |
| 4,911,200 A | 3/1990 | Ben-Arie |
| 4,913,196 A | 4/1990 | Williams et al. |
| 4,936,984 A | 6/1990 | Blandford et al. |
| 4,941,518 A | 7/1990 | Williams et al. |

(List continued on next page.)

*Primary Examiner*—Steven O. Douglas
(74) *Attorney, Agent, or Firm*—Niro, Scavone, Haller & Niro

(57) ABSTRACT

An automatic filter shutoff device removably connected to a water container and in fluid communication with a water dispenser, which is adapted to monitor water dispensing and disable dispensing after a predetermined amount of water usage. The device includes a housing containing a water filter and removably connected to the water container; a monitoring and disabling mechanism having a shutoff apparatus moveable between first and second locations, the first location being one in which water dispensing is monitored by the mechanism, and the second location being one in which the mechanism is placed in an interfering position with the connection between the housing and the water container. The shutoff apparatus automatically moves into the second location after the predetermined amount of water usage has occurred, and without interrupting water dispensing from the then-connected water container, so that the used filter shutoff device must be replaced in order to reestablish connection to a successive water container.

A filter mechanism is also provided with a housing containing a water filter and having a throat removably connected to a bottled water container. The throat is a restricted orifice sized to permit a volumetric flow rate of not greater than about 7,500 ml./min. of water passage during inversion of the water container and initial flow from the container into the filter. A plurality of vent holes are located in an upper surface of the filter housing and sized to permit air from the filter to escape into the water container and allow continuous water flow from the container into the filter. When a new water container is connected to the housing, the water level within the filter does not reach the vent holes in the filter housing.

19 Claims, 14 Drawing Sheets

U.S. PATENT DOCUMENTS

| | | |
|---|---|---|
| 4,969,991 A | 11/1990 | Valadez |
| 5,049,270 A | 9/1991 | Carrano et al. |
| 5,064,097 A | 11/1991 | Brog et al. |
| 5,086,806 A | 2/1992 | Engler et al. |
| 5,089,144 A | 2/1992 | Ozkahyaoglu et al. |
| 5,139,666 A | 8/1992 | Charbonneau et al. |
| 5,213,597 A | 5/1993 | Campbell |
| 5,240,620 A | 8/1993 | Shalev |
| 5,287,884 A | 2/1994 | Cohen |
| 5,320,752 A | 6/1994 | Clack et al. |
| 5,399,260 A | 3/1995 | Eldredge et al. |
| 5,405,526 A | 4/1995 | Sutera |
| 5,431,813 A | 7/1995 | Daniels |
| 5,439,145 A | 8/1995 | Salkeld et al. |
| 5,450,358 A | 9/1995 | Seibert et al. |
| 5,464,531 A | 11/1995 | Greene |
| 5,540,355 A | 7/1996 | Hancock et al. |
| 5,567,308 A | 10/1996 | Visser |
| 5,591,332 A | 1/1997 | Reid et al. |
| 5,616,243 A | 4/1997 | Levy |
| 5,622,618 A | 4/1997 | Brane et al. |
| 5,628,895 A | 5/1997 | Zucholl |
| 5,638,847 A | 6/1997 | Hoch, Jr. et al. |
| 5,647,416 A | 7/1997 | Desrosiers et al. |
| 5,653,878 A | 8/1997 | Reid |
| 5,688,397 A | 11/1997 | Malmborg |
| 5,698,091 A | 12/1997 | Kuennen et al. |
| 5,744,030 A | 4/1998 | Reid et al. |
| 5,779,911 A | 7/1998 | Haug et al. |
| 5,800,701 A | 9/1998 | Larsen |
| 5,814,212 A | 9/1998 | Hsu |
| 5,841,884 A | 11/1998 | Yamamoto |
| 5,853,572 A | 12/1998 | Kuennen et al. |
| 5,868,924 A | 2/1999 | Nachtman et al. |
| 5,876,610 A | 3/1999 | Clack et al. |
| 5,888,381 A | 3/1999 | Primdahl et al. |
| 5,893,388 A | 4/1999 | Luker |
| 5,914,045 A | 6/1999 | Palmer et al. |
| 5,928,512 A | 7/1999 | Hatch et al. |
| 5,993,648 A | 11/1999 | Hunter et al. |
| 6,077,435 A | 6/2000 | Beck et al. |

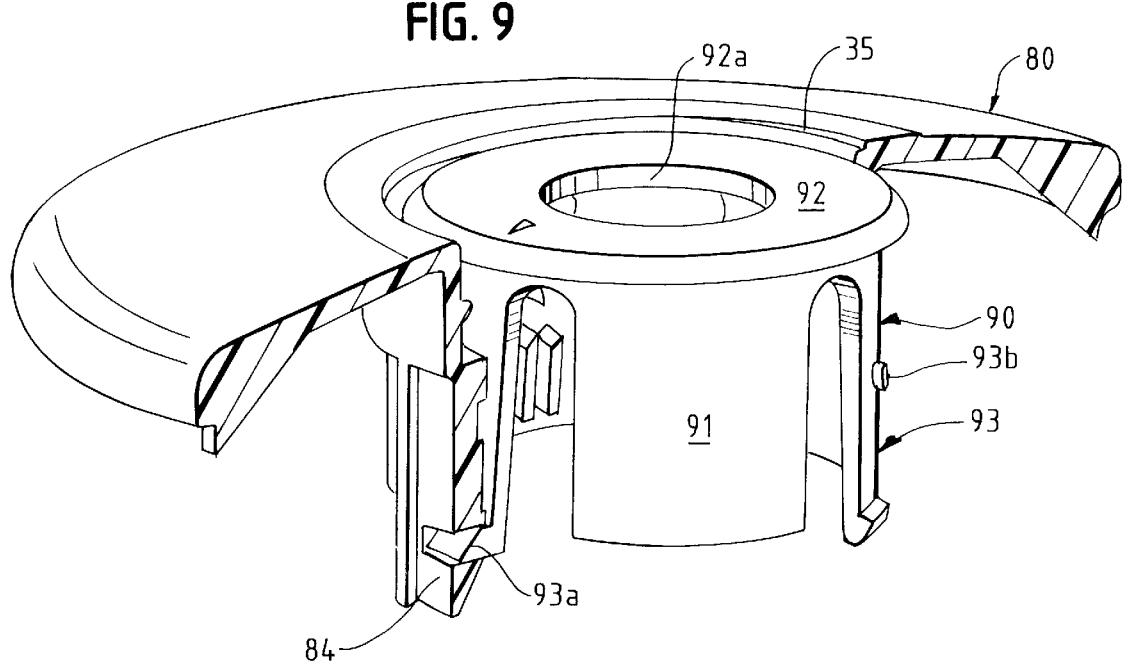
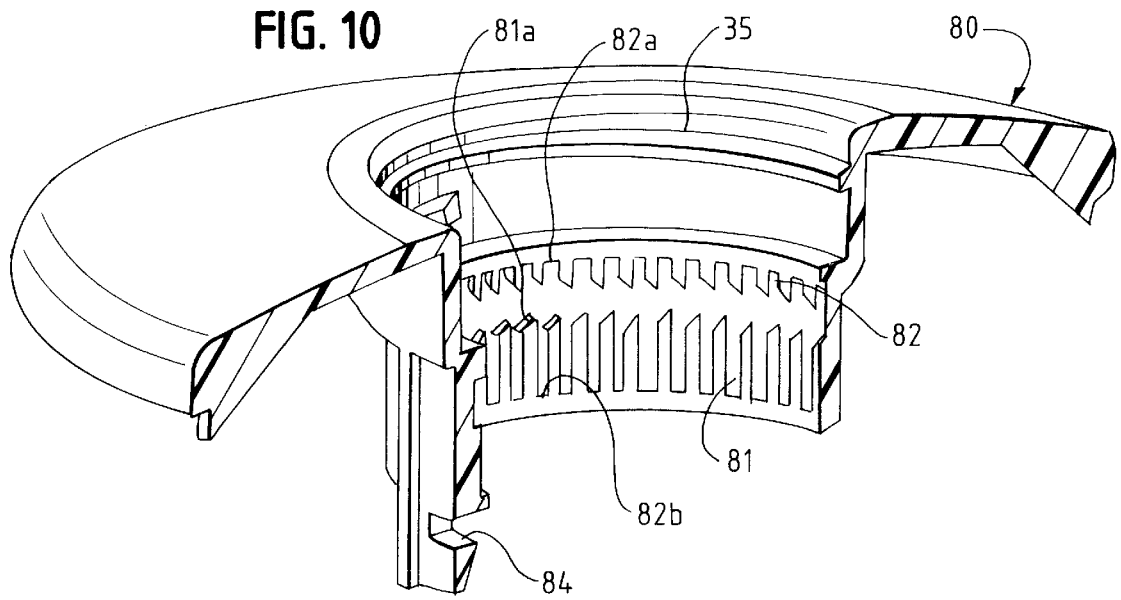

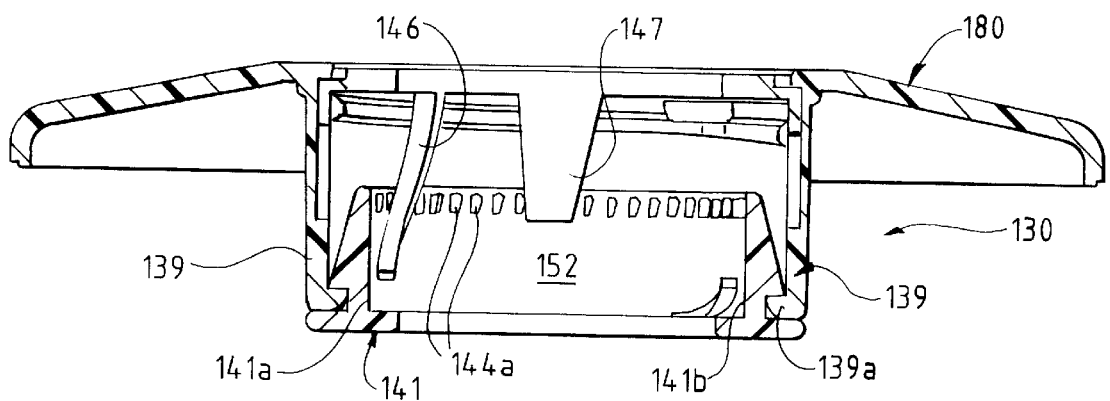
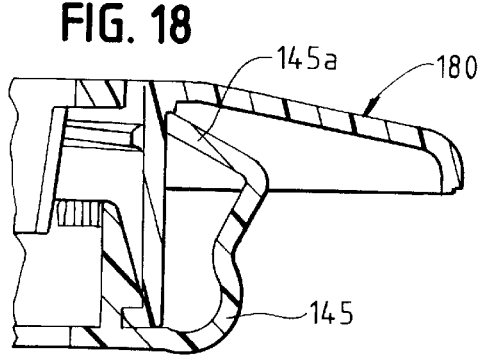 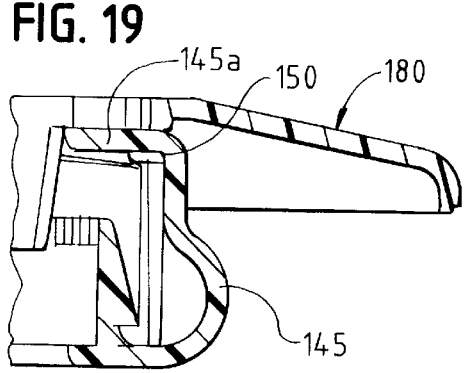
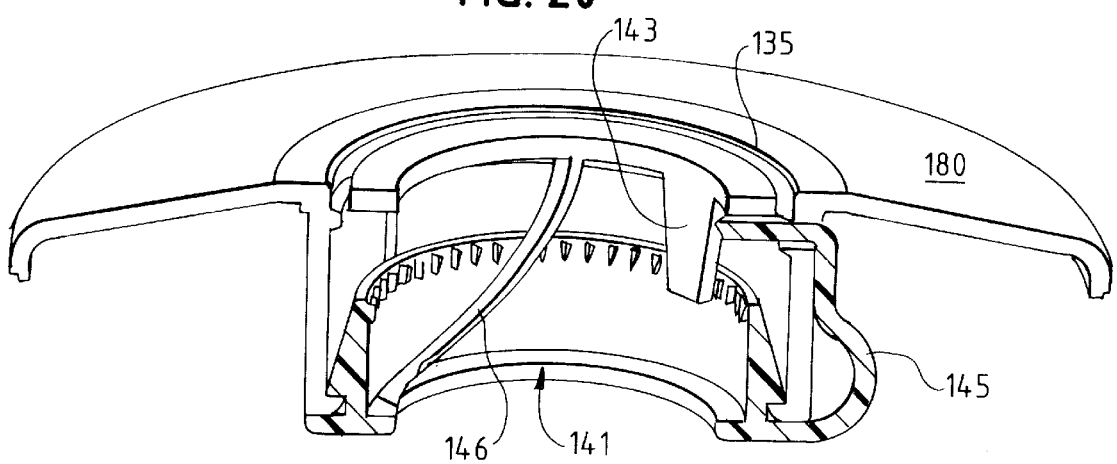

AUTOMATIC SHUTOFF DEVICE FOR FILTERED BOTTLED WATER DISPENSER

BACKGROUND OF THE INVENTION

The present invention generally relates to the dispensing of filtered, bottled water. More specifically, the invention relates to a shutoff device that monitors the number of bottles used and then disables further use of the filter when the filter has reached the end of its useful life. The device can also provide an early warning signal to the user that the filter is nearing the end of its useful life.

Self-contained filters for removing unwanted minerals and chemicals such as chlorine have become increasingly popular with bottled water users. These filters may be threadably attached or otherwise connected to the opening of a bottled water container, or may be contained within the water dispenser unit. Various devices are also known for monitoring water flow and then interrupting water flow after a predetermined use.

Some prior art devices have provided techniques for opening a pressure vessel containing a carbon filter used in water purification. However, such techniques are cumbersome and undesirable for the user. Thus, it is desirable to provide an economical self-contained dispenser shutoff and filter cartridge which may be easily replaced when a monitor indicates that the filter has reached the end of its useful life.

In general, prior art patents and known water dispensing disabling devices (herein termed "shutoff devices") with a filter have tended to concentrate on ways of interrupting water flow through the bottle opening once the filter has reached the end of its useful life, by physically blocking water flow. However, this may result in an interruption in dispensing when the water container still has a substantial volume of water in it, which is not desirable from a user viewpoint. To overcome this problem, some prior art devices provide specific shutoff mechanisms so that when the filter cartridge is removed, dispensing is stopped; these devices also require a separate filter monitor device to visually or audibly warn the user that the filter has reached the end of its useful life. Many such shutoff devices have also tended to have a number of moving parts, increasing the risk of part malfunction.

However, there is a need for a water filter shutoff device which monitors water usage and automatically disables dispensing when the filter has reached the end of its useful life, without the need to rely on visual or audible warning signals. Such a filter shutoff device would also preferably meet the following constraints. Given space constraints, the shutoff device preferably is integral with the filter, and should not unduly impede flow through the filter. The shutoff device would also preferably allow presetting at the time of manufacture to change the allowable water flow or application uses, so that the device could be used with differently rated filters and differently sized water containers. The device should be economical to manufacture and preferably not require an entirely new mold or any substantial additional investment in assembly equipment or fixtures, while also being relatively simple in design with few moving parts to reduce quality control risks. The shutoff device would also preferably disable dispensing, without interrupting water flow from the currently used water container, when a monitor indicates the useful life of the filter is over.

A filter shutoff device preferably meets NSF criteria, including qualifying as a filter "performance indication device" (PID) under NSF standards, and include component materials that have existing NSF approval for extraction. If no filter monitor/PID is provided for a water dispenser with a filter, obtaining NSF approval currently requires that the filter be tested to work at 200% of its rated capacity. If a PID is provided, the filter need only be tested to work at 120% of its rated capacity for NSF approval. For example, if a filter is rated for 150 gallons, and a filter PID is provided, the filter need only have a capacity of 180 gallons, as opposed to 300 gallons if no filter PID is provided. This is a significant added cost feature for a filter manufacturer, since providing a filter capable of filtering 300 gallons requires additional media content resulting in a significant added cost.

Filter shutoff devices must also be provided with venting in some manner to allow continuous water flow, without "lock up". One problem with such devices is that, upon initial use, as water from the inverted water bottle flows into the device, water pressure/water hammer conditions may cause unfiltered water to leak or spurt out of the venting channels and into the dispensing unit. A sufficient volume of water may escape filtration in this manner, such that the device may not receive NSF approval for, e.g., lead testing. It is also desirable to provide a filter shutoff device which overcomes this problem.

Accordingly, an object of the present invention is to provide a shutoff device integral with a filter and useable with a water dispenser, in which the water dispenser is automatically disabled at the end of the useful life of the filter.

Another object of the invention is to provide a filter shutoff device which does not impede or interrupt water flow between the water dispensing device and a water source such as an inverted water bottle. A further object is to provide such a device that qualifies as filter PID under NSF standards, enabling the more economical manufacture of the filter.

Yet another object is to provide a filter shutoff device which may be manufactured in an economical manner, such that the device monitors the number of water containers used, disables further dispensing after a predetermined number of uses, and then may be discarded and replaced with a new device.

A further object is to provide a filter shutoff device which automatically disables the connection between the device and a water container, rather than simply providing a visual indication of end of filter life, and rather than maintaining the ability to make this connection and physically impeding or interrupting water flow.

A still further object is to provide such a device with an appropriate size and configuration, together with appropriately located and sized vent holes, to ensure that unfiltered water does not leak out of the device and be dispensed.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Automatic filter shutoff device" means a device in fluid communication with a water container which filters water and then interferes with the ability to dispense water from the container after a predetermined amount of water usage (i.e., the "shutoff" feature), which may generally correspond to the useable life of the filter, has been reached. "Automatic" in this context means that shutoff occurs without the need for user intervention, such as without the need for the user to respond to a visual or audible signal from a filter monitor.

"Monitoring and disabling mechanism" means a mechanism which monitors filter life by monitoring water usage, and which includes a shutoff feature.

SUMMARY OF THE INVENTION

The objects mentioned above, as well as other objects, are solved by the present invention, which overcomes disadvantages of prior filter shutoff devices for water dispensers, while providing new advantages not believed associated with such devices.

In one preferred embodiment, An automatic filter shutoff device is provided, and is removably connected to a water container and in fluid communication with a water dispenser. The device is adapted to monitor water dispensing and disable dispensing after a predetermined amount of water usage. The device includes a housing containing a water filter and removably connected to the water container; and a monitoring and disabling mechanism having a shutoff apparatus moveable between first and second locations, the first location being one in which water dispensing is monitored by the mechanism, and the second location being one in which the mechanism is placed in an interfering position with the connection between the housing and the water container. The shutoff apparatus automatically moves into the second location after the predetermined amount of water usage has occurred, and without interrupting water dispensing from the then-connected water container, so that the used filter shutoff device must be replaced in order to reestablish connection to a successive water container. Preferably, the predetermined amount of water usage generally corresponds to the useable life of the filter.

In a preferred embodiment, the filter shutoff device is adjustable so that dispensing may be disabled after differing amounts of water usage. In one preferred embodiment, the shutoff apparatus includes a plunger whose vertical height may be varied, and the second location is one in which the plunger obstructs the connection of the filter housing and the water container. The monitoring and disabling mechanism may include a filter cap with a downwardly depending leg having a locking window engageable with a locking tab located on the shutoff apparatus. The engaging surfaces of the locking tab and locking window may be angled to facilitate entry of the tab within the window, and to prevent disengagement of the tab and window.

In a particularly preferred embodiment, the plunger has a top surface with a throat opening and annular side walls with spaced openings, and wherein the surface area of the orifice is approximately equal to the surface area of the side openings.

The monitoring and disabling mechanism may include a filter cap mounting radially disposed, opposing teeth, and the shutoff apparatus may include a rotary indexer having a radially protruding tab iteratively communicating with the teeth. In this embodiment, the rotary indexer monitors water dispensing by tracking the number of water containers used during dispensing. Preferably, the monitoring and disabling mechanism is a NSF-compliant performance indication device.

A visual indicator, such as a color band located on an outer surface of the filtering and disabling mechanism, may be provided to warn the user that the filter is nearing the end of its useful life. The monitoring and disabling mechanism may also include a visual indication to facilitate adjusting of the mechanism for differing water usages.

In an alternative embodiment, the monitoring and disabling mechanism may include a helical-shaped spring, and a rotary index engageable with teeth having a number corresponding to the predetermined amount of water usage.

In another aspect of the invention, a filter mechanism is provided which is connected to a bottled water container and adapted to be inverted and placed in fluid communication with a water dispenser. The filter mechanism includes a housing containing a water filter with a throat removably connected to the bottled water container. The throat is a restricted orifice sized, such as less than one inch or about ¾-inches in diameter, for example, to permit a volumetric flow rate of not greater than about 7,500 ml./min. of water passage during inversion of the water container and initial flow from the container into the filter. A plurality of vent holes located in an upper surface of the filter housing are provided; the vent holes are sized to permit air from the filter to escape into the water container and allow continuous water flow from the container into the filter. When a new water container is connected to the housing, the water level within the filter does not reach the vent holes in the filter housing. This embodiment may, but need not, including a monitoring and disabling mechanism having a shutoff apparatus as described above.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings. The drawings illustrate one preferred embodiment of the present invention. As further explained below, it will be understood that other embodiments, not shown in the drawings, also fall within the spirit and scope of the invention.

FIG. 9 is a side and planar perspective view of the plunger and a partial cross-sectional view of the filter cap;

FIG. 10 is a side and planar partial, cross-sectional view of the plunger and filter cap;

FIG. 17 is a side cross-sectional view of an alternative embodiment of the filter shutoff device of the present invention;

FIGS. 18 and 19 are partial, side cross-sectional views showing two positions of the locking mechanism of an alternative filter shutoff embodiment;

FIG. 20 is a side and planar cross-sectional view of the alternative filter shutoff embodiment of FIG. 17;

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
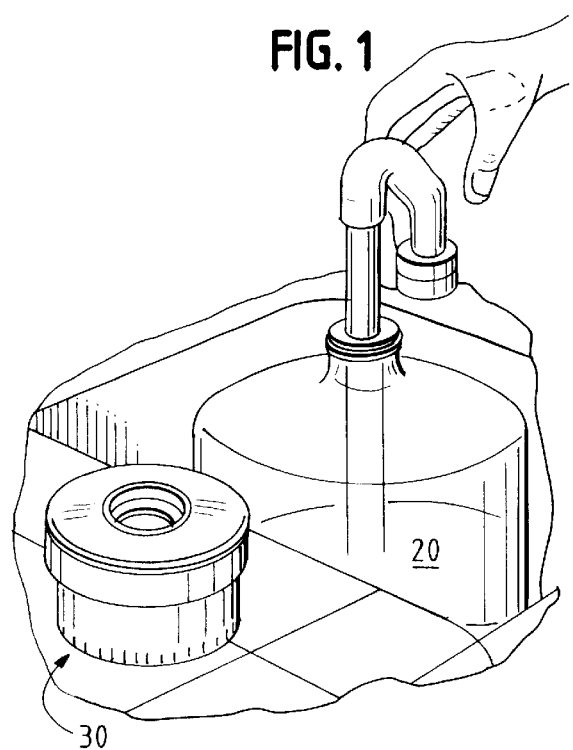
FIG. 1 is a perspective view of a water bottle being filled, together with one preferred embodiment of a filter shutoff device according to the present invention.
Figure 2:
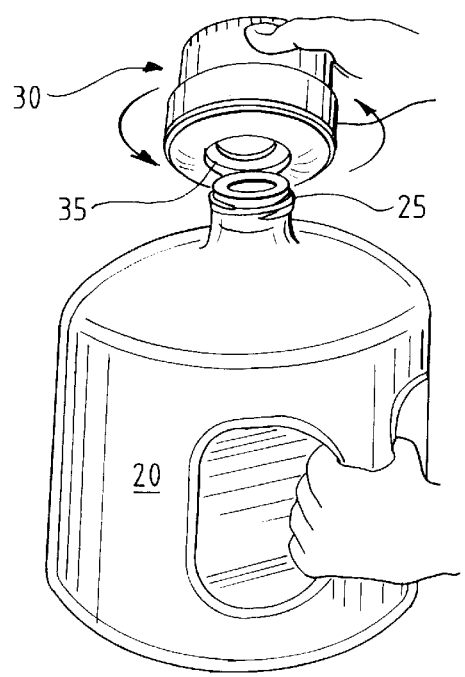
FIG. 2 is a perspective view showing the threaded connection of a preferred embodiment of the filter shutoff device according to the present invention to a water bottle.
Figure 3:
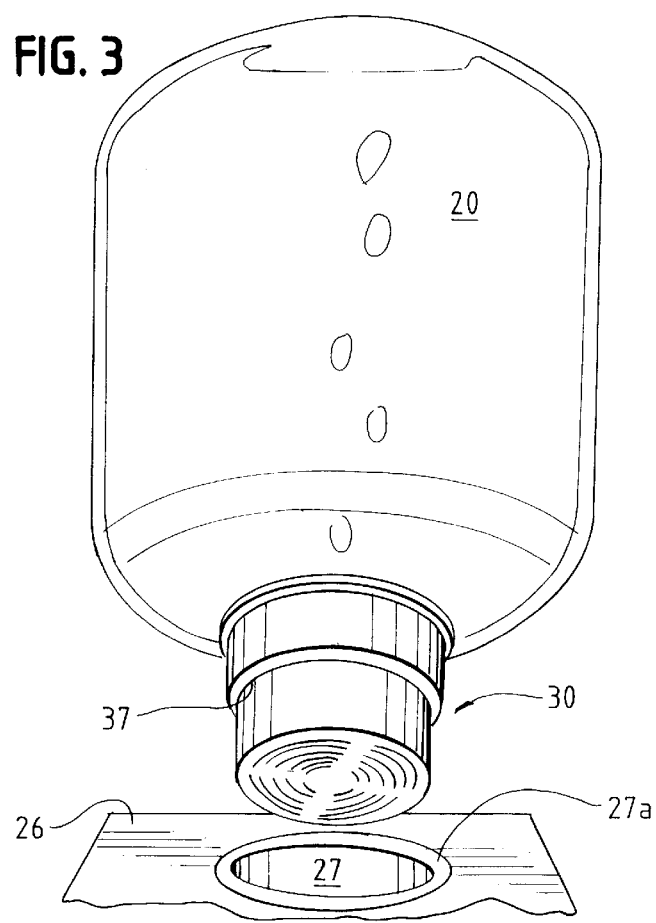
FIG. 3 is a perspective view showing the filter shutoff device, now attached to the water bottle, just prior to seating onto the upper housing of a water dispenser.

Referring first to FIGS. 1–3, a water container such as water bottle 20 is shown, together with a preferred embodiment of the filter shutoff device of the present invention, generally referred to as 30. While it is preferred that water bottle 20 have threads 35 that allow threaded connection with mating threads 25 on the neck of water bottle 20, a threaded connection is not required.

Referring to FIG. 3, filter shutoff device 30 is sized and shaped to permit its placement within opening 27 of water cooler housing 26. (The particular water dispenser chosen for use is of little importance to the present invention.) For this purpose, filter device 30 may include an enlarged rim or neck 37 that rests on the top peripheral wall 27a of aperture 27.

Figure 4:
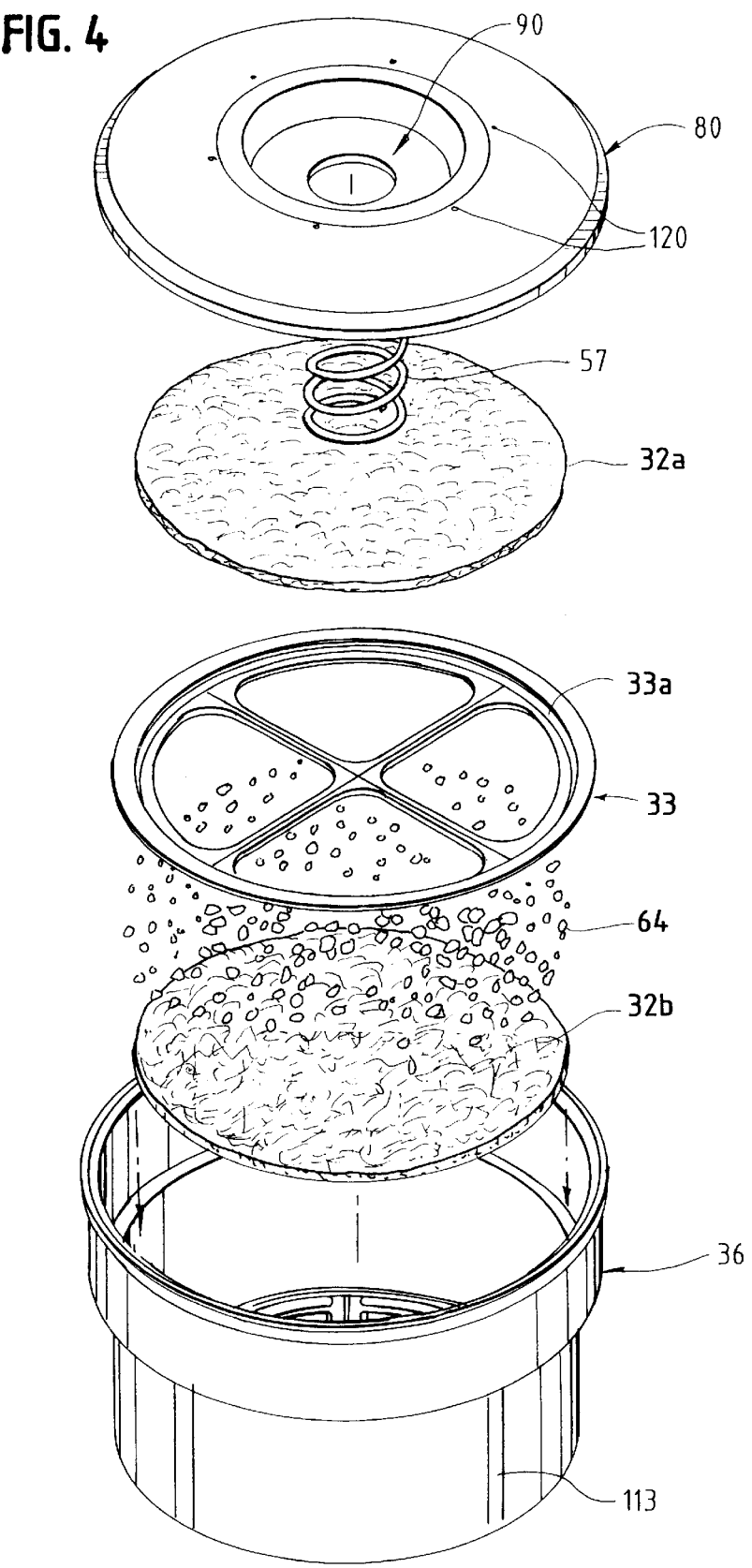
FIG. 4 is a perspective view showing various components of a preferred filter shutoff device according to the present invention.
Figure 5:
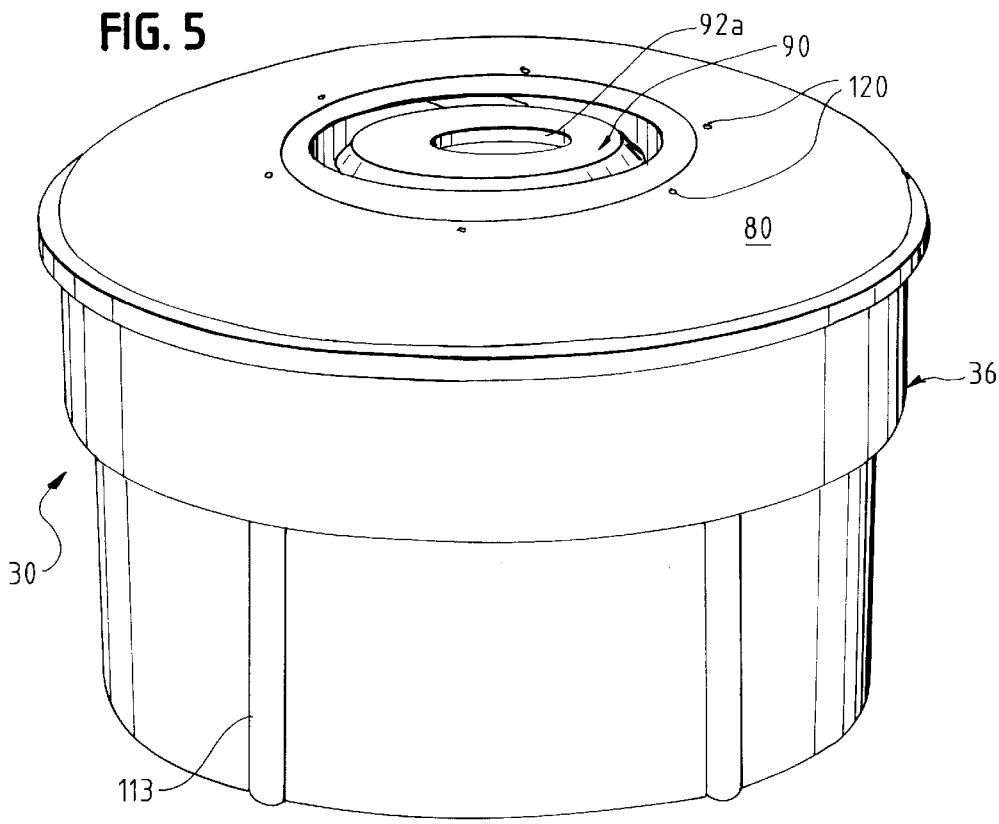
FIG. 5 is a perspective view of the preferred, assembled filter shutoff device.
Figure 6:
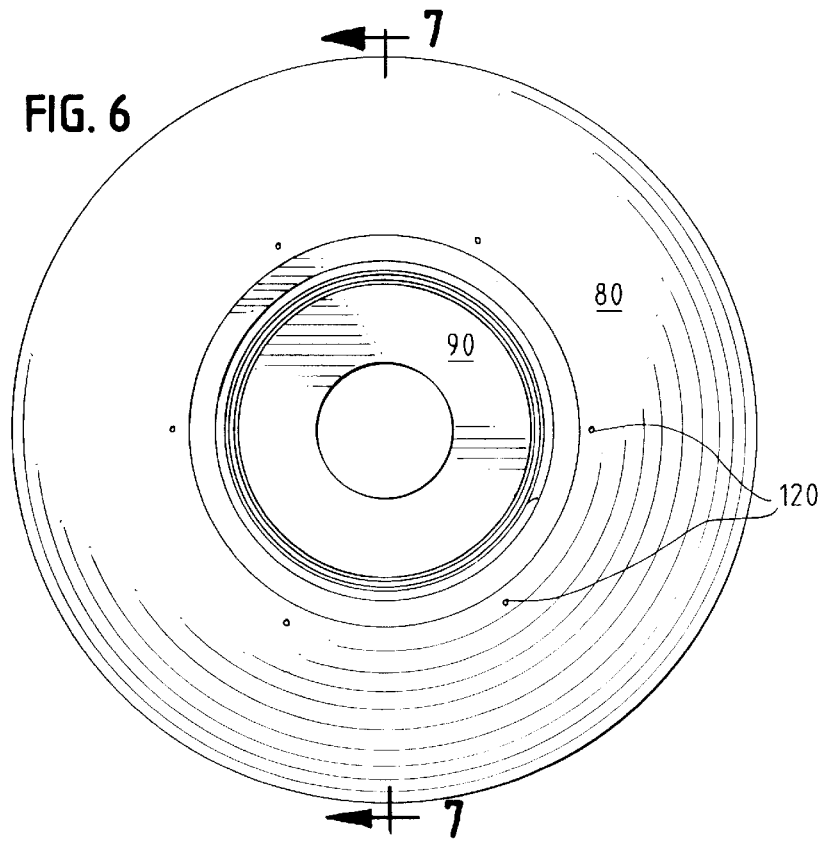
FIG. 6 is a top view of FIG. 5.

Referring now to FIGS. 4–6, one preferred embodiment of filter device 30 includes the following components: filter cap 80; plunger 90; spring 57; support or media retaining ring 33; and upper and lower filter pads 32a, 32b. Upper pad 32a is preferably sonic-welded to ring 33, inside rim 33a; lower pad 32b is preferably sonic-welded to the lower interior of filter housing 36. Pads 32a, 32b maintain the filter media, such as activated charcoal 64, in place within filter housing 36. During assembly, plunger 90 is placed down through within center opening 92a of plunger 90. Spring 57 compresses against plunger 90 and, in turn, is compressed by retaining ring 33; compression is maintained on plunger 90 for the reasons described below. Filter cap 80 may be sonic-welded to the upper surface of filter housing 36 since, in the preferred embodiment, filter shutoff 30 is designed to be replaced, rather than cleaned and re-used, when the useful life of the filter is over. Filter housing 36 is preferably generally cylindrical in shape, as shown, and includes passages 38 (FIG. 11) in its lower surface which permit water passage through the lower end of filter housing 36. Ribs 113 on the outer surface of housing 36 facilitate gripping of the housing by the user. Filter cap 80 includes vent holes 120 which, in the preferred embodiment shown, are six in number.

Figure 8:
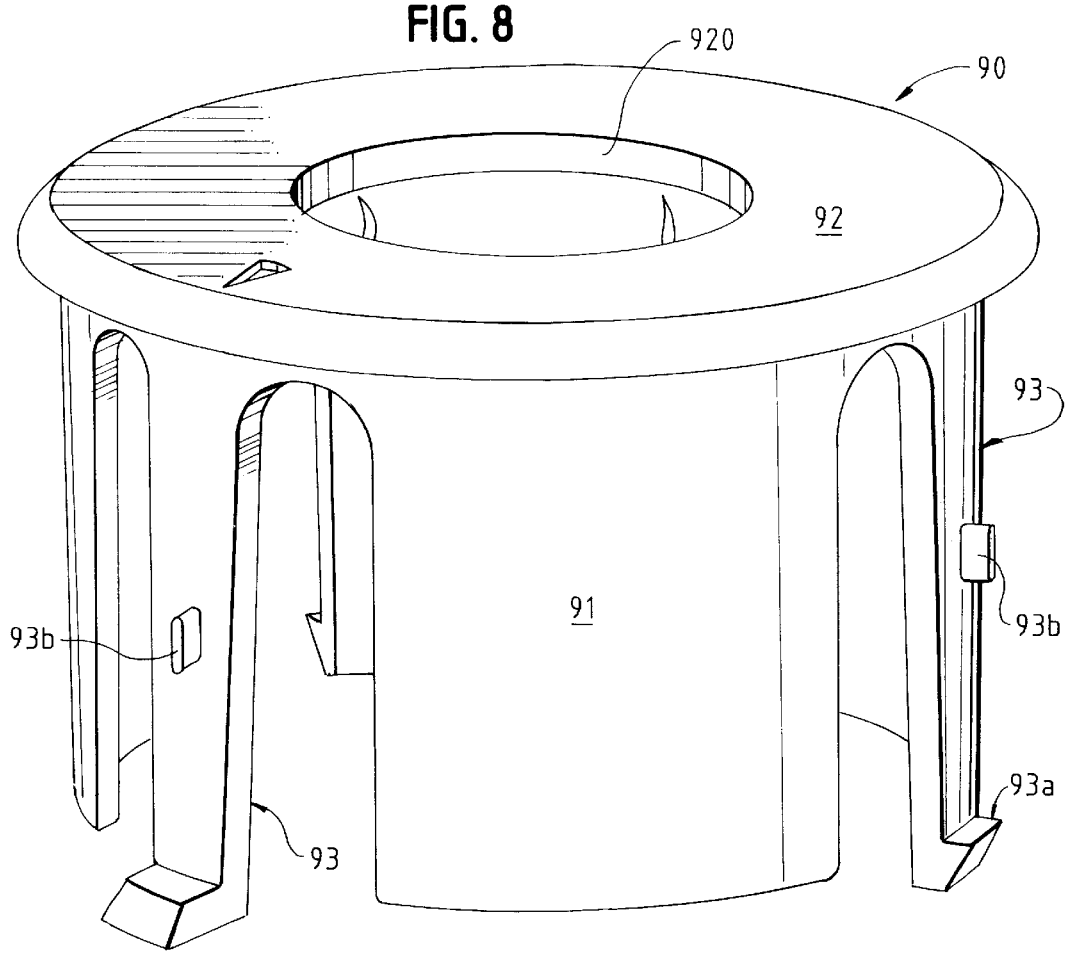
FIG. 8 is a side and planar perspective view of a preferred form of the plunger component of the filter shutoff device.

Referring to FIG. 8, a preferred form of plunger 90 includes an annular top surface 92 with a restricted throat opening 92a. Legs 93 project downwardly from top surface 92 and include projections 93b and retaining tabs 93a. Annular wall 91 and legs 93 are separated by arcuate openings such as U-shaped openings, as shown.

Figure 7:
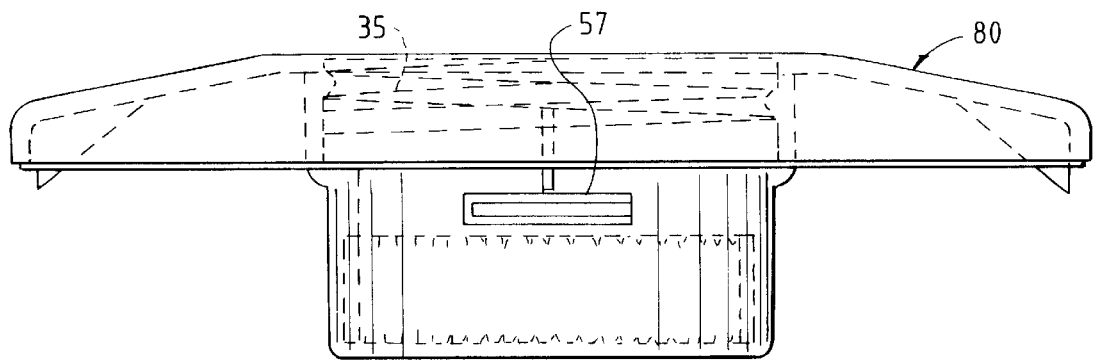
FIG. 7 is a sectional view along reference line 7—7 of FIG. 6.
Figure 29:
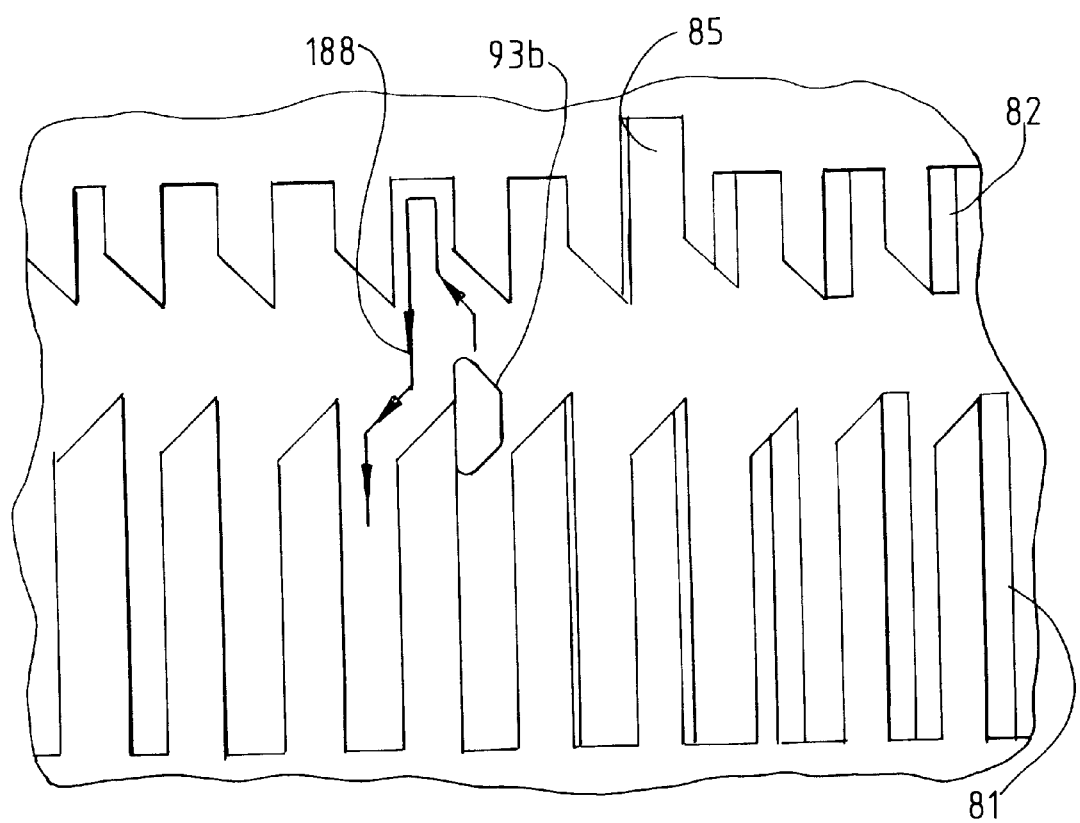
FIG. 29 is an exploded view of a portion of filter cap 80 of FIG. 10.

Referring to FIGS. 7 and 10, filter cap 80 has an inner annular wall 83 with internal threads 35. Annular wall 83 houses an opposing series of angled teeth, lower teeth 81 and upper teeth 82. Prior to installation of a water bottle, projection 93b of plunger 90 is in an upper position in between upper teeth 82. Upon installation of water bottle 20, projection 93b will move straight down about ¼ inch (equal to the distance that the lower edge of the water bottle must travel to meet the filter cap threads 35) until projection 93b lies between two lower teeth 81. As the water bottle is threaded onto the filter cap, projection 93b will continue to move downward between the two lower teeth 81. Referring to FIG. 29, projection 93b preferably traverses the path shown by circuit 188.

Filter cap 80 and plunger 90 are preferably designed such that projection 93b does not touch either the upper surface 82a of upper teeth 82 or the lower surface 81b of lower teeth 81 (see FIG. 10), so that projection 93b is not stressed during use. While other dimensions may obviously be used, in a preferred embodiment upper teeth may have a length equal to the length of projection 93b teeth 81. For example, in the preferred embodiment, the shorter and longer sides of upper teeth 82 may have a length of 0.062 and 0.109 inches, respectively, while the shorter and longer sides of lower teeth 81 may have a length of 0.253 and 0.294 inches, respectively. (The individual teeth may vary slightly in length, given the individual sections of the collapsible cored use to mold the filter cap.) By designing the filter cap so that the lower teeth 81 are longer than the upper teeth 82, this ensures that follower projection 93b will index over and into position so that when threading the filter cap onto the bottle, projection 93b will continue down the correct channel between the lower teeth, and avoid backtracking of projection 93b due to clockwise rotation of the threading action.

In operation, and referring now to FIGS. 7–16, plunger 90 rotates as filter shutoff device 30 is replaced and connected to new water bottles. Plunger rotation is caused by the interaction of projection 93b with opposing angled teeth 81, 82. During normal water dispensing and filter use, plunger 90 is positioned at a vertical level that permits threaded connection of threads 35 of filter cap 80 with threads 25 on the neck of bottle 20 (FIG. 2). Plunger 90 is maintained by spring 57 in the highest vertical position permitted. As plunger 90 incrementally rotates during the successive use of water bottles, projection 93b moves within opposing teeth 81, 82, which are off-set and angled to induce this rotation. (This continues until retaining tab 93a reaches locking window 84. Upon locking, which is further discussed below, plunger 90 is locked at a vertical level such that the plunger covers threads 35 and interferes with engagement of the threads by a water bottle.

Referring to FIGS. 13–16, "lead-in" angled surfaces $93a_1$, and 84a of retaining tab 93a and locking window 84, respectively, are provided. These surfaces are angled to allow the locking tab to cam its way onto the inside surfaces of window "frame" 84a as a result of the rotation of plunger 90 during the last few iterative movements of projection 93b between teeth 81, 82, just prior to the locking of tab 93 within window 84. This camming action flexes leg 93 toward the filter throat until retaining tab 93a clears ramped surface 84a and enters the window itself.

Figure 16:
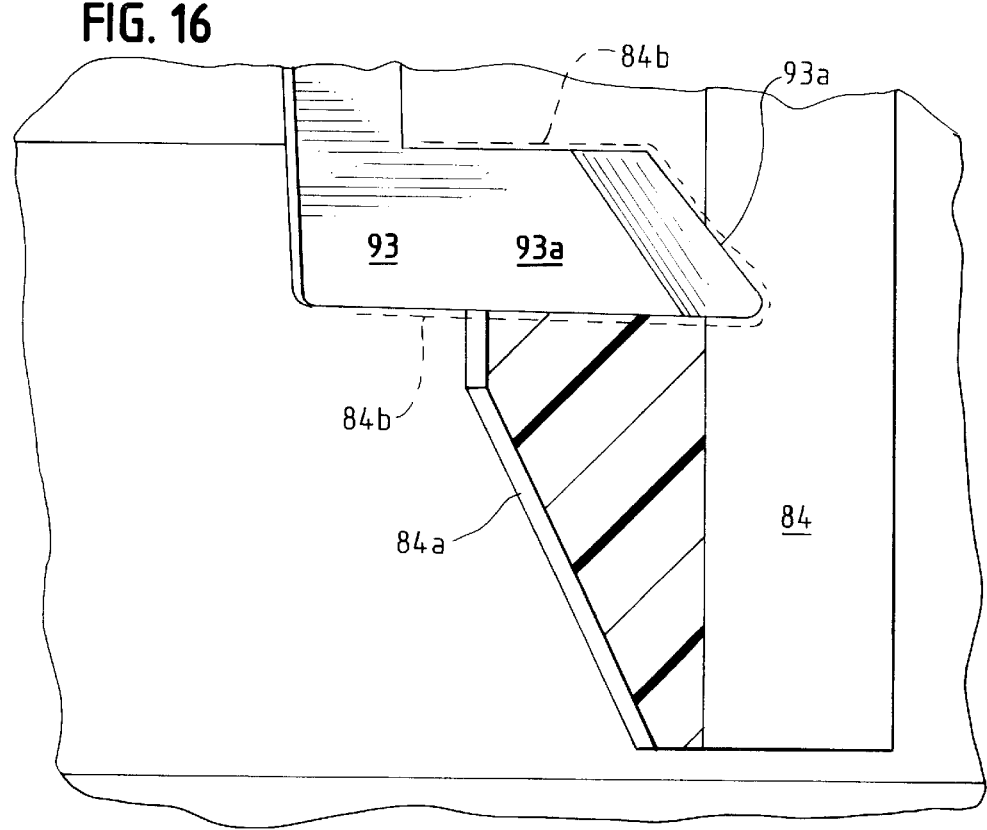
FIG. 16 is an exploded view of the locking mechanism of the preferred filter shutoff device.
Figure 21:
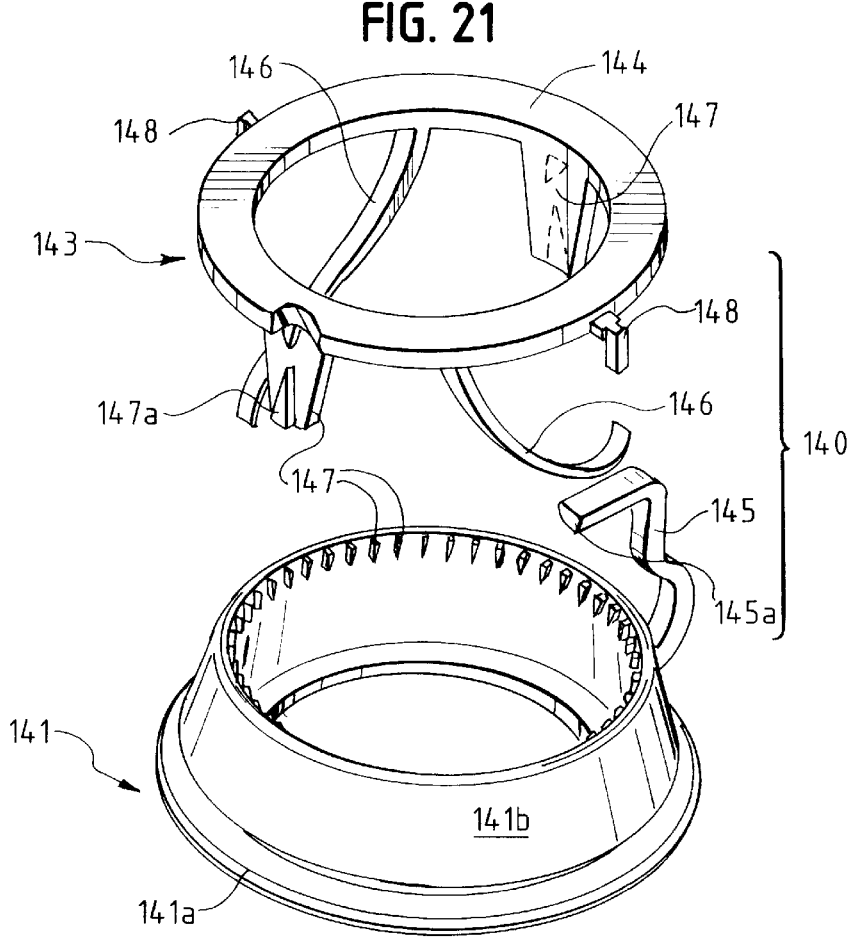
FIG. 21 is a side and planar perspective view of the monitoring and shutoff components of the alternative filter shutoff device of FIG. 17.
Figure 22:
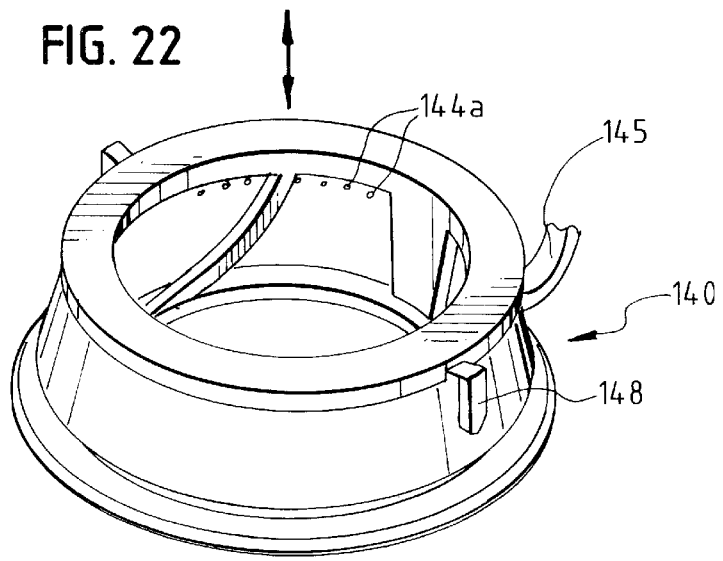
FIG. 22 is a side and planar perspective view of the assembled components shown in FIG. 21.

The locking mechanism is also designed to reduce the risk of losing the locking function, as now described. Referring to FIG. 16, if the user tries to connect the bottle threads to filter shutoff device 30 after the locking mechanism has been engaged (and, thus, retaining tab 93a lies within locking window 84), a downward force is exerted on plunger 90 by the water bottle end. This pushes retaining tab 93a against the bottom surface 84b of locking window 84. Bottom surface 84b and the adjacent bottom surface of locking tab 93a are each angled slightly in a downward direction moving away from filter throat 91a. This results in locking tab 93a having a tendency to "bury" itself deeper into locking window 84, rather than trying to slide back toward the filter throat and losing engagement with the locking window.

Figure 11:
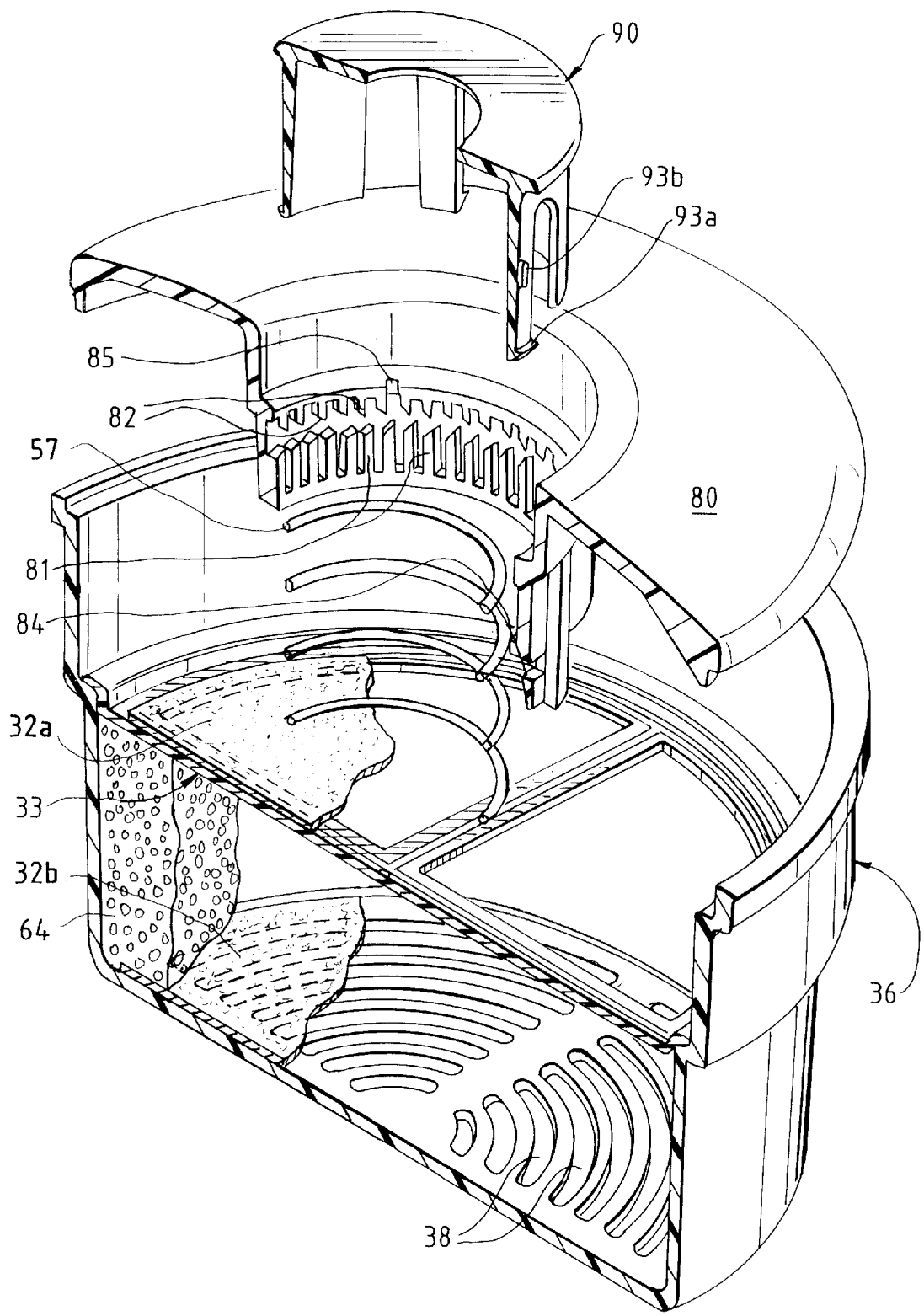
FIG. 11 is a side and planar partial, cross-sectional view of the plunger, filter cap and filter housing.
Figure 12:
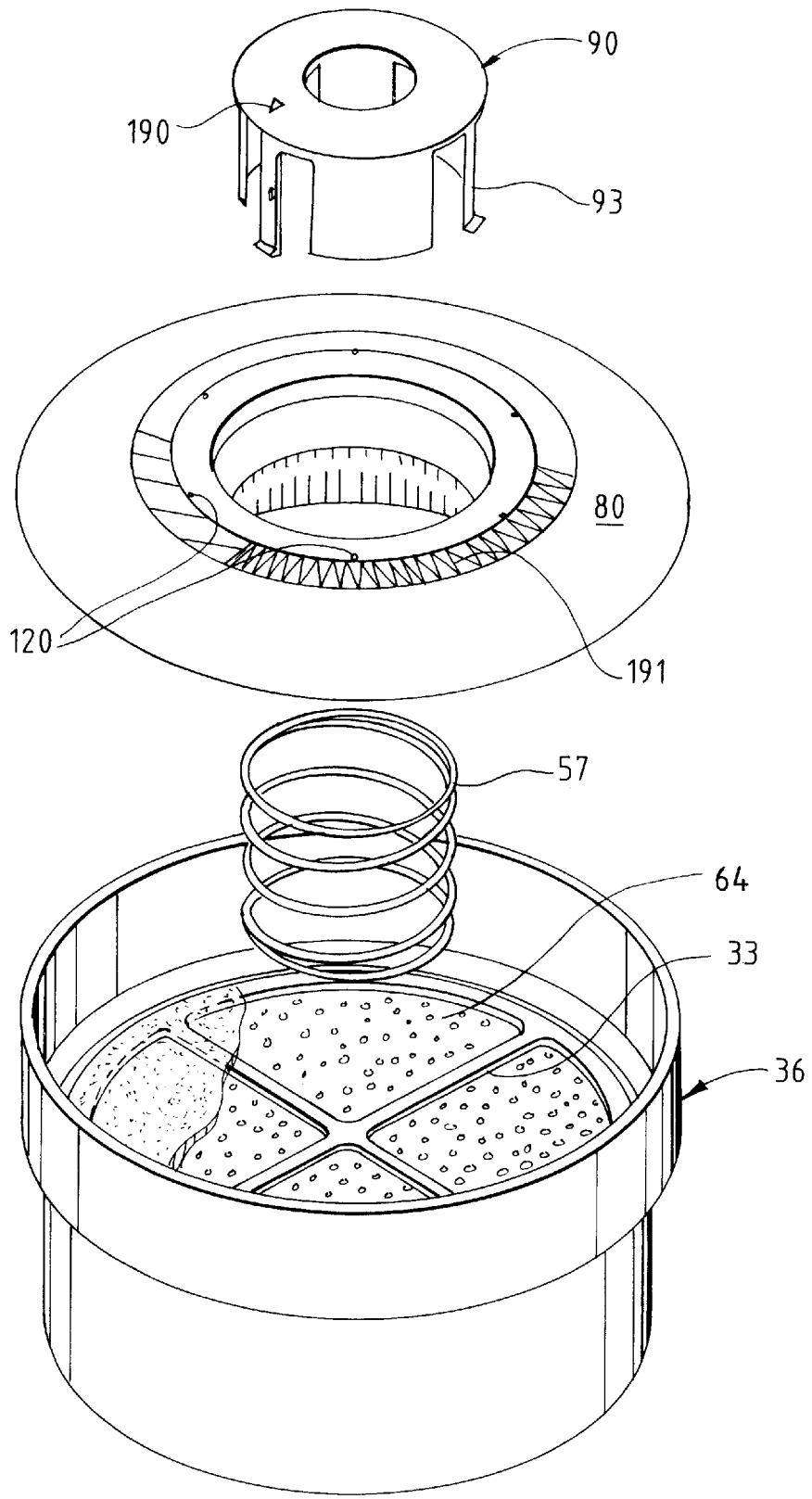
FIG. 12 is a side and planar perspective view of the plunger, filter cap, spring and filter housing.
Figure 13:
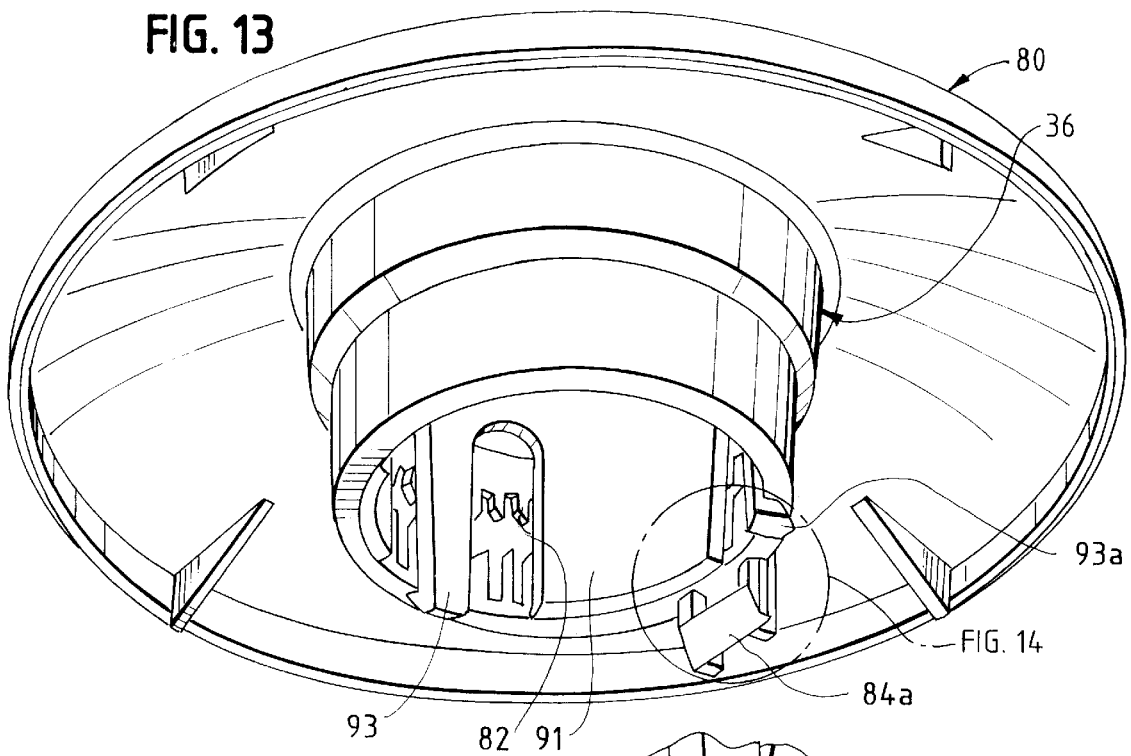
FIG. 13 is a side and bottom perspective view of the lower portions of the plunger and filter cap.
Figure 14:
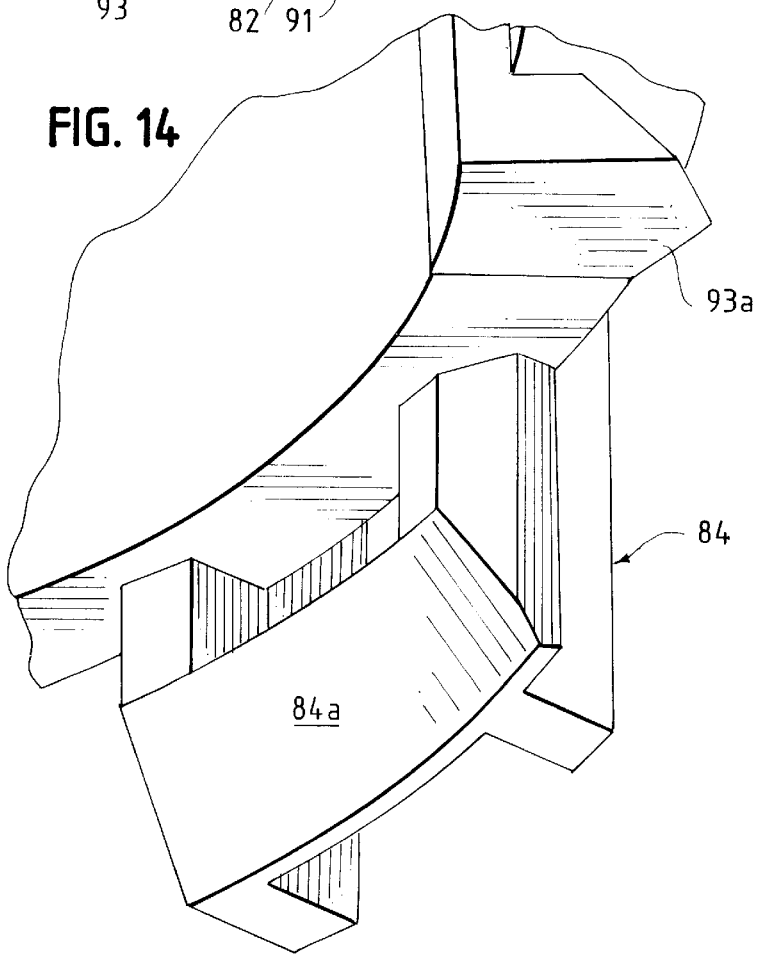
FIG. 14 is an exploded view of the area circled "14" in FIG. 13.
Figure 15:
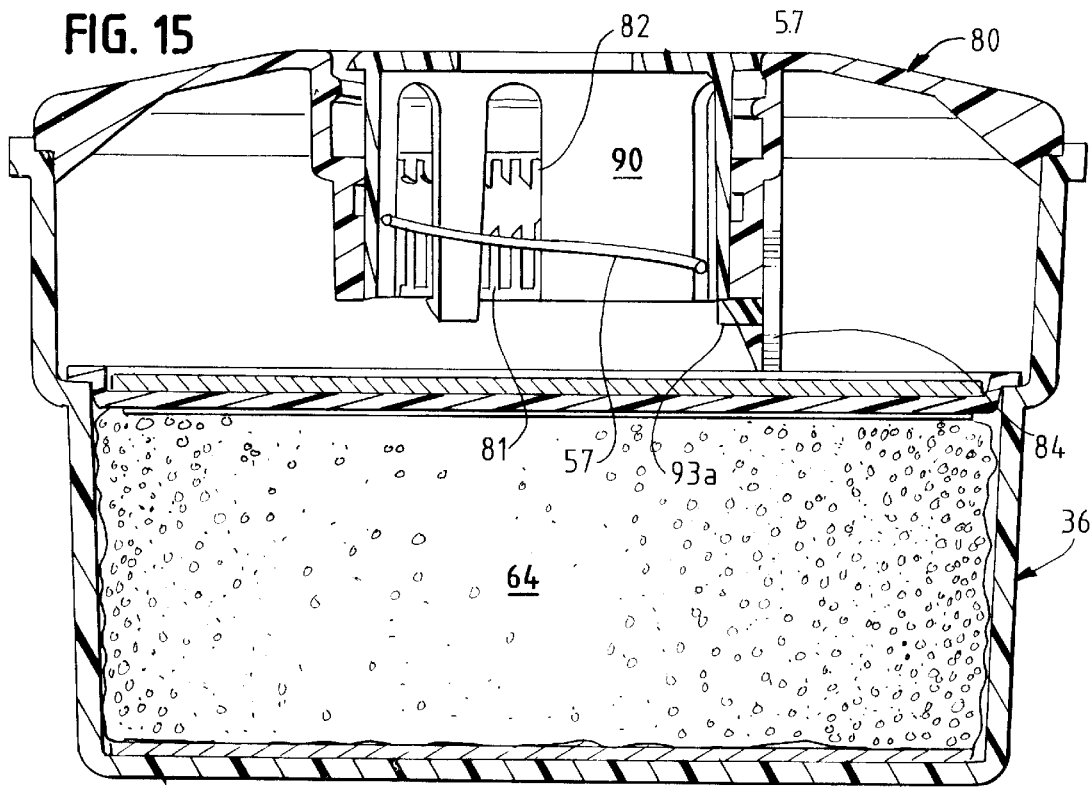
FIG. 15 is a side cross-sectional view of the preferred assembled filter shutoff device.

Referring to FIGS. 9 and 11, opening 85 is provided as a relief, to ensure that projections 93b on the plunger do not shear off as the plunger is installed. In addition, opening 85 provides a visual indication to the installer, giving the installer the ability to choose the number of iterations necessary before lock-up of the filter occurs. For example, in the device shown in FIG. 11, fifty teeth 81, 82 and three openings 85 are provided about the inner circumference of cap 80. The positions of openings 85 allow a design in which, by initially locating the plunger so that projection 93b is situated in an opening 85, filter shutoff device 30 can be configured to provide any number of iterations necessary to correlate the volume of bottles being used and the filter rating, and trigger filter lock-up.

The openings of plunger 90 should be appropriately sized, as now described. First, plunger top 92 is preferably provided with a restricted circular throat 92a, to reduce water hammer through the plunger. In the preferred embodiment, this opening has a diameter of about ¾ inches, which is 0.442 in². Once the opening in plunger top 92 is sized, the vertical slots in apron 91 of plunger 90 are then sized, by providing slots having an area such that the effective surface area of the openings permitting water travel out the side annular walls of plunger 90 is equal to the surface area of throat opening 92a in plunger top surface 92.

Given this preferred plunger size and configuration, it was found that water will fill the upper chamber of the filter, i.e., above media retaining ring 33 and below cap 80, relatively slowly, such that water will not be permitted to pass through vent holes 120.

In a particularly preferred embodiment, an early warning signal may be used to notify the user of the impending end of the filter's useful life. For example, a red flag may be sprung into position within the center of the filter when 90% of the filter's useful life has expired. As another example, bi-colored icons or a graduated bi-color band 191 (FIG. 12) may be used to indicate that the useful life of the filter is nearing an end, by matching dot or projection 190 on rotating plunger top surface 92, for example, with band 191.

Filter cap 80 carrying opposed teeth 81, 82 may be manufactured by machining a collapsible core, such as those available from Detroit Mold Engineering of Detroit, owned by Cincinnati Millicron (Catalog No. CC-402-PC). When designing the teeth, a proper draft angle is required to insure release from the molding surface. Each of the teeth has a different shape depending on where they are located on the collapsing core. The collapsing action of the DME core is inward, or perpendicular to the primary draw angle of the mold, and works with a specific number of pie shaped segments, as disclosed in U.S. Pat. Nos. 3,247,548 and 3,660,001, incorporated herein by reference. These pie shapes, usually consisting of twelve segments, may have two different sizes, e.g., six large and six small. Each segment should be machined separately.

Another aspect of the invention concerning vent holes 120 is now discussed. Referring to FIG. 3, when water bottle 20 is inverted into a dispensing position, a seal is created between shutoff filter rim 37 and bottle seat ledge 27a. To allow continuous dispensing without lock-up, air passes from outside the filter through vent holes 120 in filter cap 80 (FIG. 6), and into water bottle 20. When the filter is initially installed on the bottle and the bottle is rotated into the functioning position, during the time that water flows down and wets and fills the filter media, the water flow path that presents the least amount of resistance, and thus the path the water actually travels, is through the vent holes. This is believed due to a water hammer effect such that the existing air already in the filter will tend to escape through these vent holes, carrying water with it. This initial condition may result in some (less than about 1 cc.) untreated water escaping through the vent holes and into the treated water. This initial condition may result in a failure to comply with NSF regulations regarding lead treatment, for example.

To solve this problem, a reduced throat diameter "D" (FIG. 6) is provided, e.g., the throat diameter was reduced from about 2 inches to about ¾ inches, for example. In the preferred embodiment, six vent holes 120 are provided on the upper surface of filter cap 80, and pass completely through the filter cap. One preferred size of the vent holes is about 0.031 inches; however the vent holes may be sized larger, in which case fewer than six may be used. Vent holes 120 permit air to escape from the filter, and flow between the bottle threads and into the water bottle. Using this restricted throat diameter, when water bottle 20 is inverted, water slowly passes into filter shutoff device 30, such that the water level in the device slowly rises. In a particularly preferred embodiment, 0.7266 minutes was required for 3500 ml. of water to flow through a filter shutoff device having a throat diameter of about ¾ inches (a fill rate of 4,817 ml./min), whereas only 0.1728 minutes was required for the same volume of water to flow through an identical filter with a throat diameter of about 1.5 inches (a fill rate of 20,255 ml./min). It was noted that water hammer continued to cause water passage through the vent holes until the fill rate was reduced below about 7,500 ml./min. Unlike prior art designs, even during the filling stage and before the water reaches its final level within the filter due to the pressure head created by the bottle neck, the water level never reaches above the level of vent holes 120. With this design, then, water never flows out through the vent holes, allowing NSF compliance, and reducing spillage and mess.

Referring now to FIGS. 17–25, an alternative embodiment of the filter shutoff device of the present invention, generally referred to as 130, is shown. Referring first to FIG. 17, filter cap 180 has opposed vertical walls 139 ending in tabs 139a designed to removably snap into the opening formed by rim 141a of ring 141. The outside walls 141b of ring 141 preferably taper, as shown, to make room for this removable snap fit. A filter, not shown, is contained within opening 152 created by this connection Referring still to FIGS. 17–25, filter cap 180 is assembled to a monitoring and locking device, generally referred to as 140, which consists of rotary indexing ring 141 and stationary ring 143. Ring 141 includes a number of teeth 144a axially spaced about the upper internal periphery of the ring, and a flexible or spring-loaded tab 145 positioned along the outside edge of ring 141, having a distal end 145a and a function described further below. Ring 143 includes a curved annular disc 144 with two curved springs 146, which may be helically-shaped, opposing tabs 148 on the ring periphery, and two opposed indexing tabs 147. Indexing tabs 147 each have triangular projections 147a, 147b, preferably shaped as shown.

Figure 23:
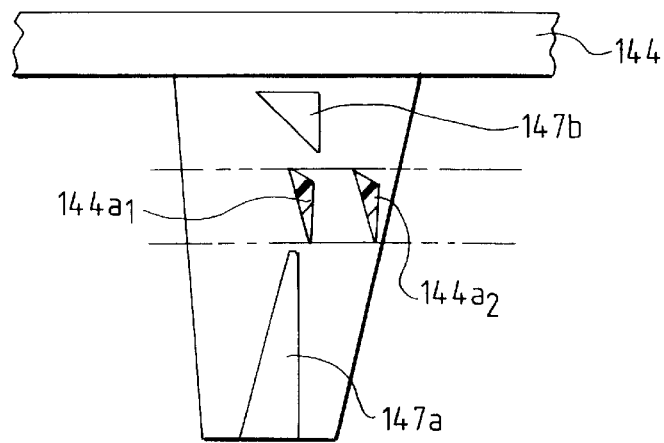
FIGS. 23–25 are side, enlarged views of the FIG. 17 embodiment showing opposed teeth and their interaction with a tab of the alternative filter shutoff device.
Figure 24:
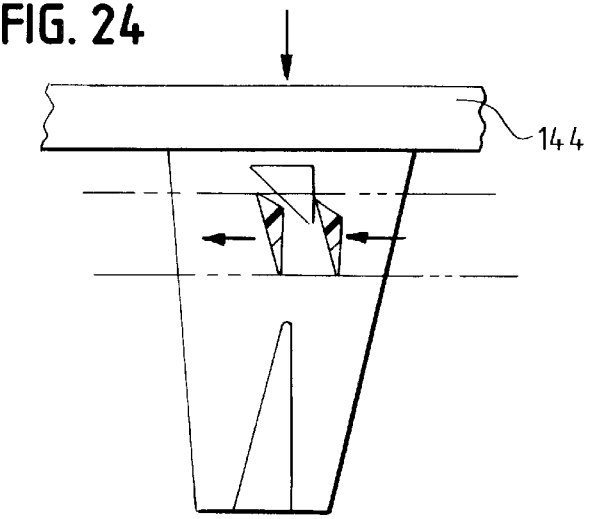
Figure 25:
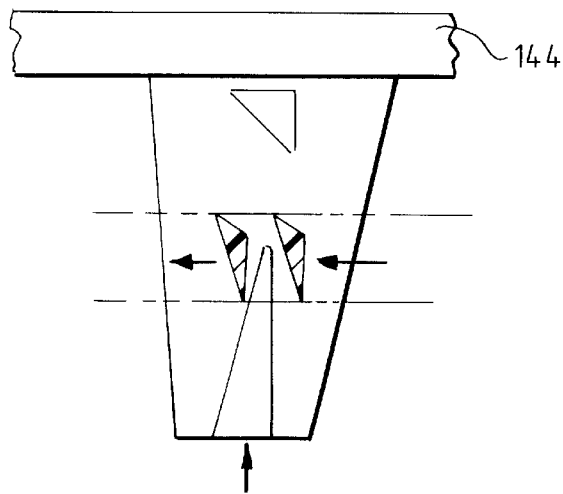

Referring now to FIGS. 23–25, during normal water dispensing and operation of the filter, teeth 144a are positioned as shown in FIG. 23. Each time filter shutoff device 130 is removed from an empty water bottle 20 and threaded to a new water bottle, device 140 is shaped, sized and configured to provide an rotary indexing movement such that tab 147 is advanced in a counter-clockwise direction (as seen when looking downward on device 130) the distance of one tooth, as now explained. Each time device 130 is removed from an empty water bottle, ring 143 is forced upward by springs 146, causing two adjacent teeth 144a to be positioned adjacent triangular projection 147b, as shown in FIG. 24. The interaction of the leading tooth $144a_1$ against projection 147b causes an incremental counter-clockwise rotation of ring 144 and indexing tab 147 (when viewing device 130 from a downward direction). Then, when a new water bottle is threadably attached to device, 130, ring 143 is forced in a downward direction by the neck of the bottle. When this occurs, indexing tab 147b moves downward as well so that leading tooth $144a_1$ now contacts projection 147a, causing another incremental counter-clockwise rotation of ring 144 and indexing tab 147, as shown in FIG. 25, such that trailing tooth $144a_2$ is in the position that leading tooth $144a_1$ of FIG. 23 previously occupied.

In this manner, ring 143 is continued to be advanced in a rotary direction until the disassembly of device 130 from an empty water bottle causes spring-loaded tab 145 to reach opening 150 in vertical wall 139 of filter cap 180. Now, distal edge 145a, which was earlier prevented from doing so (see FIG. 18), enters opening 150 and halts further rotary movement of ring 143 and indexing tab 147, as shown in FIGS. 19–20. When this occurs, device 130 can no longer be threadably connected to a new water bottle since the presence of distal end 145a within opening 150 prevents downward movement of ring 143, so that ring 143 remains in a position that covers internal threads 135 of filter cap 180, as shown in FIG. 20.

As will now be understood, the components of filter monitoring and locking device 140 may be shaped and oriented such that the number of teeth used corresponds to the number of bottles which may be used before the filter is disabled. For example, if 45 teeth are used for 3-gallon bottles, then the filter disable device will activate after 135 gallons of water have been used.

Figure 26:
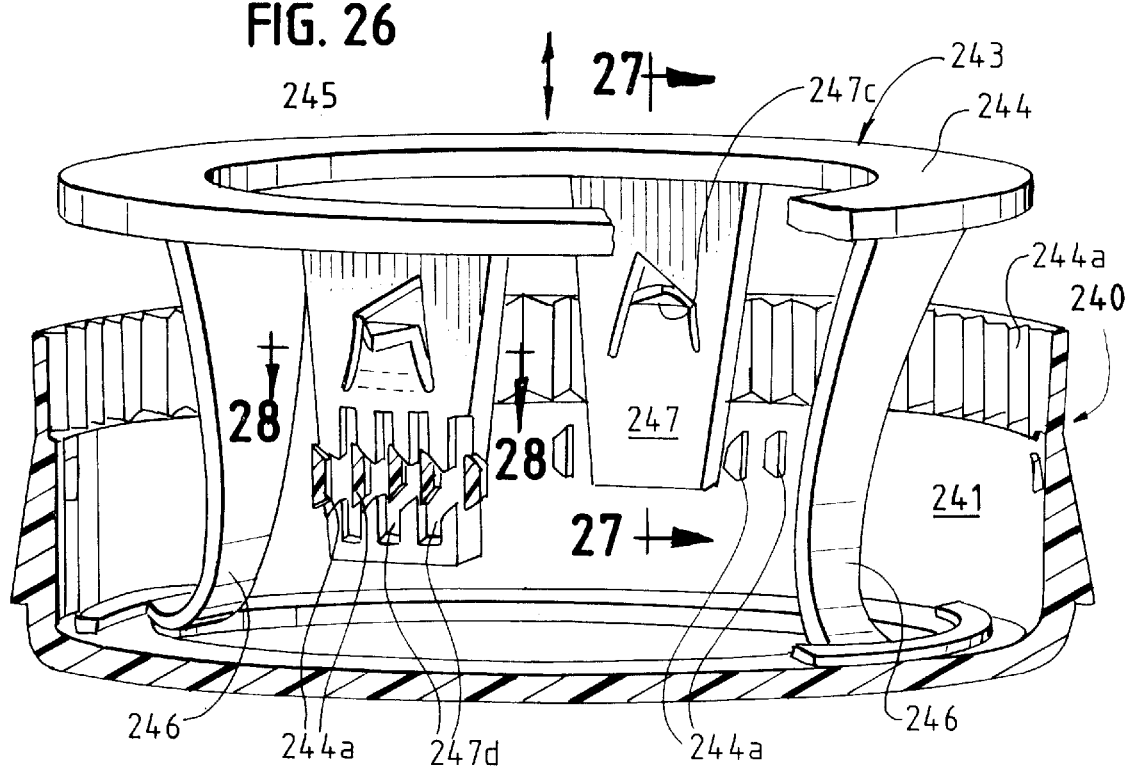
FIG. 26 is a partial side and cross-sectional view of an alternative, one-piece embodiment of the filter shutoff device of the present invention.
Figure 27:
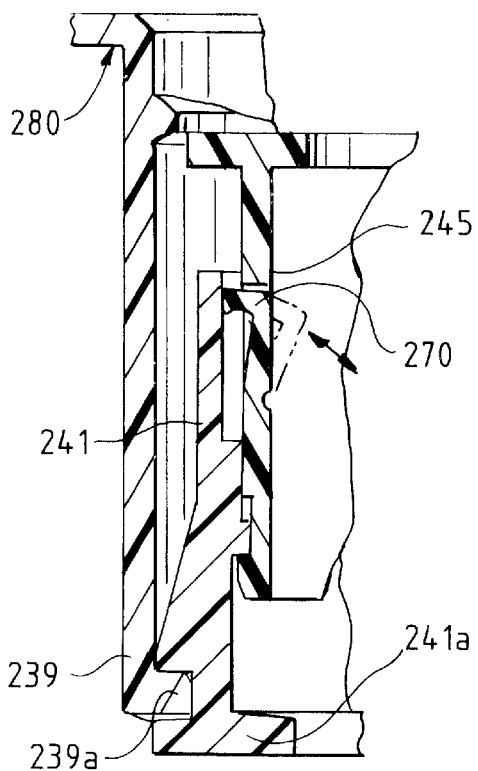
FIG. 27 is a partial sectional view along reference line 27/27 of FIG. 26.
Figure 28:
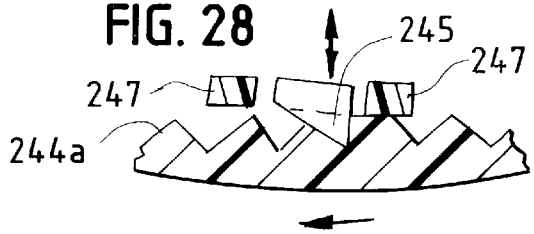
FIG. 28 is a sectional view along reference line 28/28 of FIG. 26.

In an alternative preferred embodiment, shown in FIGS. 26–28, filter monitoring and locking device 240 is of one-piece construction, and includes a single molded component consisting of upper ring 243 and lower ring 241. Indexing tab 247 extends down from ring 244 and includes an upper opening 247c with a pointed tab 245. Indexing tab 247 also includes a lower, stepped series of openings 247d. In a similar manner as described above, ring 243 and tab 247 are rotary indexed in a counter-clockwise direction (again, when viewing device 240 from above) by the stepped orientation and interaction of openings 247d with teeth 244a, as shown in FIGS. 26 and 28. As the filter shutoff device is used, removed and then connected to a new water container, tab 247 rotates and pointed tab 245 moves within succeeding angled openings 260. When tab 247 reaches a position permitting the entry of tab 245 into opening 270 on ring 241 (FIG. 27), further rotary movement of ring 243 ceases, disabling the filter shutoff device by preventing its threaded connection with water container 20.

It will be understood that the filter shutoff device of the present invention may be used with water containers other than the inverted water bottles shown in the drawings. For example, the device may be used with water pitchers or sports bottles. It will also be understood that the filter shutoff device may be used with a variety of water dispensing devices, and a variety of filters, other than those specifically described here.

While the invention has been described with reference to a threaded connection between filter shutoff device 30 and water bottle 20, it will be understood that device 30 may be modified for use with water containers that are not intended to be threadably connected to device 30. For example, filter shutoff device 30 could be used with non-threaded connections between device 30 and water bottle 20 such as those described in U.S. Pat. Nos. 5,222,531 and 5,289,855, incorporated herein by reference, such that a cap could be press-fit onto the filter device. As another example, instead of both the water container and the filter shutoff device having threads, one could have a partial thread and the other a simple projection that would engage the partial thread when the filter shutoff device is rotated; this could act as a helical ramp for the projection, pulling the two components tightly together.

The above description is not intended to limit the meaning of the words used in the following claims that define the invention. Rather, it is contemplated that future modifications in structure, function or result will exist that are not substantial changes and that all such insubstantial changes are intended to be covered by the claims.

We claim:

1. An automatic filter shutoff device removably connected to a water container and in fluid communication with a water dispenser, the device being adapted to monitor water dispensing and disable dispensing after a predetermined amount of water usage, comprising:

a housing containing a water filter and removably connected to the water container;

a monitoring and disabling mechanism having a shutoff apparatus moveable between first and second locations, the first location being one in which water dispensing is monitored by the mechanism, and the second location being one in which the mechanism is placed in an interfering position with the connection between the housing and the water container;

wherein the shutoff apparatus automatically moves into the second location after the predetermined amount of water usage has occurred, and without interrupting water dispensing from the then-connected water container, so that the used filter shutoff device must be replaced in order to reestablish connection to a successive water container.

2. The automatic filter shutoff device of claim 1, wherein the predetermined amount of water usage generally corresponds to the useable life of the filter.

3. The automatic filter shutoff device of claim 1, wherein the device is adjustable so that dispensing may be disabled after differing amounts of water usage.

4. The automatic filter shutoff device of claim 3, wherein the monitoring and disabling mechanism comprises a visual indication to facilitate adjusting of the mechanism for differing water usages.

5. The automatic filter shutoff device of claim 1, wherein the shutoff apparatus comprises a plunger whose vertical height may be varied, and wherein the second location comprises a position in which the plunger obstructs the connection of the filter housing and the water container.

6. The automatic filter shutoff device of claim 1, wherein the monitoring and disabling mechanism further comprises a filter cap with a downwardly depending leg having a locking window engageable with a locking tab located on the shutoff apparatus.

7. The automatic filter shutoff device of claim 6, wherein the engaging surfaces of the locking tab and locking window are angled to facilitate entry of the tab within the window.

8. The automatic filter shutoff device of claim 6, wherein the engaging surfaces of the locking tab and locking window are angled to prevent disengagement of the tab from the window.

9. The automatic filter shutoff device of claim 1, wherein the plunger has a top surface with a throat opening and annular side walls with spaced openings, and wherein the surface area of the orifice is approximately equal to the surface area of the side openings.

10. The automatic filter shutoff device of claim 1, wherein the monitoring and disabling mechanism further comprises a filter cap mounting radially disposed, opposing teeth, and the shutoff apparatus comprises a rotary indexer having a radially protruding tab iteratively communicating with the teeth, and wherein the rotary indexer monitors water dispensing by tracking the number of water containers used during dispensing.

11. The automatic filter shutoff device of claim 1, wherein the monitoring and disabling mechanism comprises a NSF-compliant performance indication device.

12. The automatic filter shutoff device of claim 1, wherein a visual indicator is provided to advise the user that the filter is nearing the end of its useful life.

13. The automatic filter shutoff device of claim 12, wherein the visual indicator comprises a color band located on an outer surface of the filtering and disabling mechanism.

14. The automatic filter shutoff device of claim 1, wherein the monitoring and disabling mechanism comprises a helical-shaped spring.

15. The automatic filter shutoff device of claim 1, wherein the monitoring and disabling mechanism comprises a rotary index engageable with teeth having a number corresponding to the predetermined amount of water usage.

16. A filter mechanism connected to a bottled water container adapted to be inverted and placed in fluid communication with a water dispenser, comprising:

a housing containing a water filter with a throat removably connected to the bottled water container, the throat comprising a restricted orifice sized to permit a volumetric flow rate of not greater than about 7,500 ml./min. of water passage during inversion of the water container and initial flow from the container into the filter;

a plurality of vent holes located in an upper surface of the filter housing and sized to permit air from the filter to escape into the water container and allow continuous water flow from the container into the filter;

wherein when a new water container is connected to the housing, the water level within the filter does not reach the vent holes in the filter housing.

17. The filter mechanism of claim 16, further comprising a monitoring and disabling mechanism having a shutoff apparatus moveable between first and second locations, the first location being one in which water dispensing is monitored by the mechanism, and the second location being one in which the mechanism is placed in an interfering position with the connection between the housing and the water container, wherein the shutoff apparatus automatically moves into the second location after the predetermined amount of water usage has occurred, and without interrupting water dispensing from the then-connected water container, so that the filter shutoff device may not be connected to a successive water container.

18. The filter mechanism of claim 16, wherein the restricted orifice has a diameter of less than about one inch.

19. The filter mechanism of claim 16, wherein the restricted orifice has a diameter of about ¾ inches.

* * * * *